(12) United States Patent
Gaiser

(10) Patent No.: US 8,695,569 B2
(45) Date of Patent: Apr. 15, 2014

(54) VEHICLE BURNER

(75) Inventor: Gerd Gaiser, Reutlingen (DE)

(73) Assignee: Bosch Emission Systems GmbH & Co. KG, Stuttgart (DE)

( * ) Notice: Subject to any disclaimer, the term of this patent is extended or adjusted under 35 U.S.C. 154(b) by 1153 days.

(21) Appl. No.: 12/640,483

(22) Filed: Dec. 17, 2009

(65) Prior Publication Data

US 2010/0154745 A1 Jun. 24, 2010

(30) Foreign Application Priority Data

Dec. 19, 2008 (DE) .......................... 10 2008 063 990

(51) Int. Cl.
*F01N 3/00* (2006.01)
*F01N 3/025* (2006.01)

(52) U.S. Cl.
USPC ........... 123/446; 123/434; 123/457; 123/502; 60/303; 60/299; 60/300; 60/320

(58) Field of Classification Search
USPC ........... 60/286, 311, 274, 285, 303, 299, 300, 60/320; 123/300, 304, 299, 434, 694, 446, 123/457, 502, 510, 511, 670
See application file for complete search history.

(56) References Cited

U.S. PATENT DOCUMENTS

| | | | | |
|---|---|---|---|---|
| 3,048,014 A | * | 8/1962 | Schmidt | 60/39.23 |
| 4,858,431 A | * | 8/1989 | Leonhard et al. | 60/297 |
| 5,253,475 A | * | 10/1993 | Kabasin | 60/274 |
| 5,277,025 A | * | 1/1994 | Gonze et al. | 60/274 |
| 5,284,016 A | * | 2/1994 | Stark et al. | 60/303 |
| 5,320,523 A | * | 6/1994 | Stark | 431/353 |
| 5,339,630 A | * | 8/1994 | Pettit | 60/303 |
| 5,419,121 A | * | 5/1995 | Sung et al. | 60/274 |
| 5,634,330 A | * | 6/1997 | Achleitner et al. | 60/274 |
| 5,846,067 A | * | 12/1998 | Nishiyama et al. | 431/115 |
| 6,345,609 B1 | * | 2/2002 | Djordjevic | 123/509 |
| 6,708,486 B2 | * | 3/2004 | Hirota et al. | 60/297 |

(Continued)

FOREIGN PATENT DOCUMENTS

| | | |
|---|---|---|
| AT | 5 04 523 B1 | 6/2008 |
| DE | 3311603 | 10/1984 |

(Continued)

*Primary Examiner* — Stephen K Cronin
*Assistant Examiner* — Raza Najmuddin
(74) *Attorney, Agent, or Firm* — McGlew and Tuttle, P.C.

(57) ABSTRACT

A vehicle burner (6) for heating a gas flow (14) in a motor vehicle is provided with a fuel pump (10) for delivering a fuel to an injection nozzle (11) that can be actuated for injecting the fuel into a combustion chamber (7), with an air delivery device (16) for delivering air to the combustion chamber (7), with a control (17) for operating the. A vehicle burner (6), which is coupled with the fuel pump (10), with the air delivery and/or air regulating device (16) and with the injection nozzle (11). Burner waste gas, which is generated during the operation of the. A vehicle burner (6) by the reaction of fuel with air in the combustion chamber (7), is used to heat the gas flow (14). To increase efficiency, a control (17) determines a quantity of fuel, a quantity of air and a fuel pressure as a function of a presettable heat output. The control (17) actuates the air delivery and/or air regulating device (16) for setting the quantity of air determined, the fuel pump (10) for setting the fuel pressure determined and the injection nozzle (11) for setting the quantity of fuel determined to set the predetermined heat output.

20 Claims, 2 Drawing Sheets

(56) References Cited

U.S. PATENT DOCUMENTS

| | | | |
|---|---|---|---|
| 6,899,069 B2* | 5/2005 | Mattes et al. | 123/90.12 |
| 7,150,146 B2* | 12/2006 | Blaschke et al. | 60/286 |
| 7,367,182 B2* | 5/2008 | Takahashi et al. | 60/286 |
| 7,552,584 B2* | 6/2009 | Wang et al. | 60/286 |
| 8,015,803 B2* | 9/2011 | Huber et al. | 60/286 |
| 2001/0018171 A1* | 8/2001 | Al-Halbouni | 431/8 |
| 2003/0066287 A1* | 4/2003 | Hirota et al. | 60/297 |
| 2003/0089331 A1* | 5/2003 | Ueda et al. | 123/295 |
| 2004/0154562 A1* | 8/2004 | Mattes et al. | 123/90.11 |
| 2004/0191142 A1* | 9/2004 | Takemura et al. | 423/9 |
| 2005/0000209 A1* | 1/2005 | Takahashi et al. | 60/286 |
| 2005/0109019 A1* | 5/2005 | Blaschke et al. | 60/284 |
| 2005/0172616 A1* | 8/2005 | Reichardt et al. | 60/286 |
| 2005/0247048 A1* | 11/2005 | Schaller et al. | 60/286 |
| 2006/0130812 A1* | 6/2006 | Tsutsui | 123/446 |
| 2007/0220867 A1* | 9/2007 | Clerc et al. | 60/288 |
| 2008/0078172 A1* | 4/2008 | Miller et al. | 60/303 |
| 2009/0075223 A1* | 3/2009 | Mosiewicz | 431/351 |
| 2009/0126354 A1* | 5/2009 | Gieshoff et al. | 60/320 |
| 2010/0077731 A1* | 4/2010 | Jeong et al. | 60/286 |
| 2012/0073268 A1* | 3/2012 | Khadiya et al. | 60/277 |
| 2012/0085080 A1* | 4/2012 | Khadiya | 60/274 |

FOREIGN PATENT DOCUMENTS

| | | | |
|---|---|---|---|
| DE | 42 16 523 A1 | 12/1993 | |
| DE | 44 47 286 A1 | 7/1996 | |
| DE | 102 40 208 A1 | 1/2004 | |
| DE | 10230401 | 1/2004 | |
| DE | 102006060299 * | 6/2008 | |
| EP | 1 378 710 A2 | 1/2004 | |
| EP | 1 591 154 A1 | 11/2005 | |
| JP | 2005273577 A * | 10/2005 | F02M 21/02 |
| JP | 2008240532 A * | 10/2008 | |
| WO | 02/063266 A1 | 8/2002 | |
| WO | 02/066809 A2 | 8/2002 | |
| WO | 2008/080183 A1 | 7/2008 | |

* cited by examiner

VEHICLE BURNER

CROSS REFERENCE TO RELATED APPLICATIONS

This application claims the benefit of priority under 35 U.S.C. §119 of German Patent Application DE 10 2008 063 990.7 filed Dec. 19, 2009, the entire contents of which are incorporated herein by reference.

FIELD OF THE INVENTION

The present invention pertains to a vehicle burner for heating a gas flow in a motor vehicle.

BACKGROUND OF THE INVENTION

Such a vehicle burner may be used, e.g., to heat an exhaust treatment means, which is arranged in an exhaust system of an internal combustion engine. The vehicle burner may be used to shorten the time that is needed to bring the exhaust treatment means to a minimum operating temperature or regeneration temperature, starting from which it can perform its exhaust treating function with sufficient effectiveness or the regeneration thereof. The vehicle burner is thus used to reduce pollutant emissions. It is also possible, in principle, to use such a vehicle burner in a vehicle-mounted heating means, which can be operated independently from an internal combustion engine of the vehicle, for example, in a standby heater or in a parking heater or in an auxiliary heater.

Such a vehicle burner may have a fuel pump for delivering a fuel to an injection nozzle, which can be actuated. Fuel can be injected into a combustion chamber by means of the injection nozzle, which can be actuated, a so-called injector. Furthermore, the vehicle burner comprises an air delivery and/or air regulating means, for example, a blower, pump or pressure source, for delivering air to the combustion chamber. A control provided for operating the vehicle burner is coupled with the fuel pump and with the air delivery and/or air regulating means as well as with the injection nozzle in a suitable manner. To set a predetermined heat output, the control actuates the injection nozzle to inject a quantity of fuel necessary for this and the air delivery and/or air regulating means for feeding a corresponding quantity of air. It is usual for the fuel pump to provide a constant fuel pressure during the operation of the vehicle burner, and the quantities of fuel injected into the combustion chamber can be set by means of the injection nozzle. For example, the injection nozzle may have different degrees of opening, which differ from each other by different flow resistances. In addition or as an alternative, the injection nozzle may be operated in a cyclic manner, in which case, in particular, the duration of opening and the cycle frequency can be set in order to make it possible to set the particular quantity of fuel in the manner of a pulse width modulation.

The quantity of air necessary for the particular quantity of fuel can be determined by a preset air ratio, the so-called lambda value or fuel-to-air ratio. The air ratio is usually selected to be such as to obtain the lowest possible pollutant emissions.

SUMMARY OF THE INVENTION

The object of the present invention is to provide an improved embodiment for a vehicle burner of the type mentioned in the introduction, which is characterized especially in that a better fuel conversion can be achieved.

According to the invention, a vehicle burner is provided for heating a gas flow in a motor vehicle. The vehicle burner comprises a combustion chamber, an injection nozzle, a fuel pump for delivering a fuel to the injection nozzle and an air delivery and/or air regulating means for delivering air to the combustion chamber. The fuel pump is actuated for injecting fuel into the combustion chamber. A control is provided for operating the vehicle burner. The control is coupled with the fuel pump, with the air delivery and/or air regulating means and with the injection nozzle. The burner waste gas, which is generated during the operation of the vehicle burner by the reaction of fuel with air in the combustion chamber, is used to heat the gas flow, wherein the control determines a quantity of fuel, a quantity of air as well as a fuel pressure as a function of a heat output, which can be preset. The control actuates the air delivery and/or air regulating means for setting the quantity of air determined, actuates the fuel pump for setting the fuel pressure determined, and actuates the injection nozzle for setting the quantity of fuel determined to set the predetermined heat output.

The present invention is based on the general idea of modulating the fuel pressure as a function of the required heat output. The present invention utilizes the discovery that injection parameters, for example, droplet size, droplet velocity, injection angle and depth of injection penetration, can be varied in a specific manner by changing the fuel pressure or injection pressure. Furthermore, the present invention utilizes the discovery that the quantity of air in the combustion chamber, which depends on the heat output, leads to greatly different air velocities, which significantly affects the mixture formation. In particular, the air velocity affects the geometry of the mixture formation zone within the combustion chamber, the penetration of the injection jet and of the air flow, the mixing of fuel and air, the evaporation of the injected droplets as well as an interaction between the injected droplets and the air in general. The adaptation of the fuel pressure or of the injection pressure to the currently desired burner output, which is proposed according to the present invention, takes these relationships into account, so that the fuel injection can be carried out for each type of load and hence for each quantity of air at a fuel pressure that is especially suitable for this. An optimized compromise can thus be provided for the interacting injection parameters, for example, droplet size, injection angle and droplet velocity, for each type of load and for each quantity of air. On the whole, this leads to improved conversion of the fuel in the combustion chamber. This leads to a significant improvement of the efficiency of the vehicle burner. The adaptation of the injection pressure has an especially favorable effect at lower loads. It was found that a fuel pressure selected for high loads causes a comparatively large quantity of liquid fuel to reach the walls of the combustion chamber and to be able to be converted only insufficiently there in case of small quantities of air or at a low air velocity. In particular, the fuel may coke. By adapting the fuel pressure to the heat output of the burner, it is possible, for example, to set different fuel pressures for lower heat outputs, as a result of which larger quantities of fuel can be effectively prevented from accumulating on walls of the combustion chamber. The adaptation of the fuel pressure to the heat output is achieved in the present invention by the control at first determining the quantity of fuel necessary for the heat output as a function of the heat output, determining the necessary quantity of air as a function of the quantity of fuel determined as well as a preset air ratio, and determining, as a function of the quantity of air determined and the quantity of fuel determined, the fuel pressure that is appropriate for this. The determination of the individual operating parameters may be performed partly or completely by calculation. The operating parameters may likewise be determined partly or completely from characteristics or characteristic diagrams. In particular, it is now possible to provide complete characteristic diagrams from which at least two parameters, namely, the quantity of air and the fuel pressure, can be read as a function of the heat output. In particular, a characteristic diagram is also conceivable from which all three operating parameters can be read directly. The individual operating parameters are then determined simultaneously rather than step by step.

Depending on the preset heat output, the control can now actuate the fuel pump to set the determined fuel pressure, the air delivery and/or air regulating means to set the determined quantity of air, and the injection nozzle to set the determined quantity of air. The air ratio may be preset as a fixed value or likewise determined or preset as a function of the heat output or even as a function of the quantity of fuel or other parameters.

Corresponding to an especially advantageous embodiment, the control may take into account the current combustion chamber temperature when determining the fuel pressure. This variant is based on the discovery that the combustion chamber temperature, which can be determined, for example, by means of a corresponding temperature sensor, significantly affects the evaporation of the fuel droplets injected into the combustion chamber or into the air flow. By taking into account the combustion chamber temperature when determining the fuel pressure, the particle size can be affected in a specific manner and thus adapted to the combustion chamber temperature. A suitable droplet size can be set in this manner for each combustion chamber temperature in order to optimize the evaporation of the fuel.

It is apparent that the above-mentioned features, which will also be explained below, can be used not only in the particular combination indicated, but in other combinations or alone as well without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
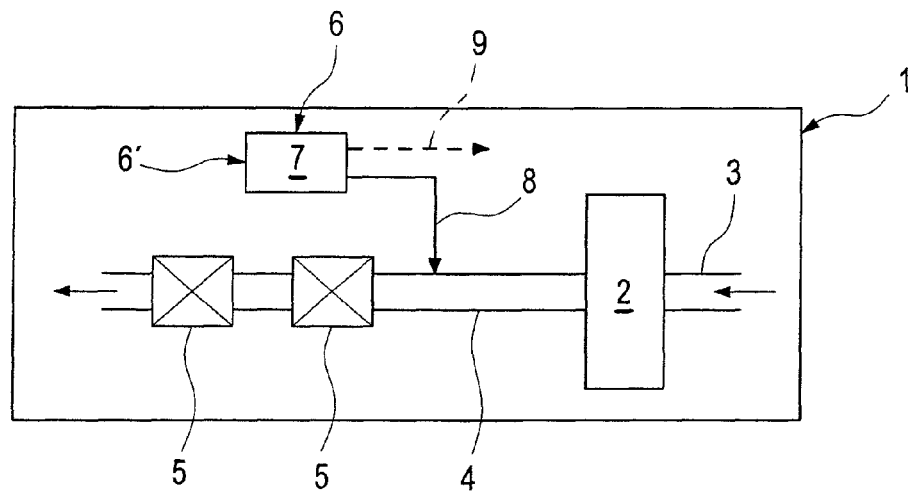
FIG. 1 is a greatly simplified, circuit diagram-like schematic view of a motor vehicle, which is equipped with a vehicle burner.

Referring to the drawings in particular, corresponding to FIG. 1, a motor vehicle 1, shown in a simplified form, comprises an internal combustion engine 2, which receives fresh air via a fresh air unit 3 and removes combustion waste gases via an exhaust system 4. exhaust gas treating means 5, for example, catalytic converters and particle filters, may be arranged in the exhaust system 4. The vehicle 1 is equipped, in addition, with a vehicle burner 6, by means of which a gas flow can be heated in the vehicle 1. The vehicle burner 6 reacts liquid fuel with air in a combustion chamber 7 for this. The fuel carried along in the vehicle 1 anyway for operating the internal combustion engine 2 is preferably used for this. The combustion chamber 7 is correspondingly connected on the exhaust gas side to the exhaust system 4 corresponding to an arrow 8 drawn in solid line. The hot burner waste gases of the combustion chamber 7 can be fed in this manner to the exhaust system 4. These hot burner waste gases are fed within the exhaust system 4, in respect to an exhaust gas flow guided in the exhaust gas strand 4, upstream of at least one exhaust gas treating means 5 to be heated by means of the vehicle burner 6. For example, heating of at least one exhaust gas treating means 5 to an operating temperature can be brought about during certain operating states of the internal combustion engine 2, for example, during cold start, to enable the exhaust gas treating means 5 to assume its cleaning function effectively. For example, many catalytic converters have a light-off temperature beginning from which they can perform their catalytic cleaning action. As an alternative or also in addition, the vehicle burner 6 may be designed as a heating means 6', which can be operated independently from the internal combustion engine. Such a heating means 6' may be designed, for example, as a parking heater and/or as an auxiliary heater. The burner waste gases generated in the combustion chamber 7 can then be used to heat the interior space of a vehicle or to heat the internal combustion engine 2 corresponding to an arrow 9 drawn in broken line.

Corresponding to FIG. 2, the vehicle burner 6 comprises (the statements made hereinafter correspondingly also apply to the heating means 6') a fuel pump 10, by means of which a fuel can be delivered to an injection nozzle 11, which can be actuated, and which may also be called an injector 11. A fuel line 12 connects for this purpose a fuel tank 13 to the suction side of the fuel pump 10 and the delivery side of the fuel pump 10 to the injection nozzle 11. The injection nozzle 11 is used to inject the fuel into the combustion chamber 7, which is connected on the waste gas side or the outlet side to the exhaust system 4 in the example according to FIG. 2. An exhaust gas flow flowing in the exhaust system 4 is indicated by arrows 14 in FIG. 2. Furthermore, FIG. 2 indicates an injection jet 15, which can be generated by means of the injection nozzle 11. The vehicle burner 6 comprises, moreover, an air delivery and/or air regulating means 16, which may likewise be, for example, a pump or a blower. It may likewise be a compressed air reservoir or another air source. For example, the combustion chamber 7 may be connected via a suitable valve means to an air regulating means of a compressed air unit of the vehicle in question, e.g., an air spring means or a compressed air brake means, or of an exhaust gas turbocharger. Air can be delivered with it, for example, from the environment, to the combustion chamber 7. Furthermore, the vehicle burner 6 has a control 17, by means of which the vehicle burner 6 can be operated. The control 17 is coupled with the fuel pump 11 via a control line 18, with the air delivery and/or air regulating means 16 via a control line 19 and with the injection nozzle 11 via a control line 20. Control 17 comprises at least one processor and is set up to determine, as a function of a preset heat output sent via a signal line 21, a quantity of fuel that is necessary to obtain this heat output. The heat output may be preset, for example, by a control device of the internal combustion engine 2 or by a desire of a user. As a function of the quantity of fuel determined as well as a function of an air ratio, which can likewise be preset or is already preset as a fixed value, the control can now determine a quantity of air that is necessary to generate a fuel-air mixture that has the desired air ratio in the combustion chamber 7 in conjunction with the quantity of fuel determined. Furthermore, control 17 is designed such that it determines a fuel pressure as a function of the quantity of air determined. The fuel pressure has a significant effect on various injection parameters, for example, droplet size, droplet velocity, injection angle and the like. The determination of the fuel pressure is performed specifically such that optimized injection parameters are obtained for the particular quantity of air that leads to a defined air velocity in case of an invariant geometry of the combustion chamber 7. For example, as a function of the quantity of air, control 17 can first determine an air velocity resulting therefrom and then determine the injection pressure that is optimal for it as a function of the air velocity. Control 17 may use, for example, a characteristic diagram 22 for this. This characteristic diagram 22 may be, in principle, of any desired complexity. In particular, it can yield, as a function of the heat output, the quantity of fuel and/or quantity of air and/or air velocity and/or air ratio and/or fuel pressure.

Control 17 is designed such that it sets the predetermined heat output by actuating the air delivery and/or air regulating means 16 for setting the quantity of air determined, the fuel pump 10 for setting the fuel pressure determined, and the injection nozzle 11 for setting the quantity of fuel determined. The injection nozzle 11 is opened to a greater or lesser extent or the duration of opening and the frequency of opening are cycled as a function of the fuel pressure.

Optimized fuel conversion can be achieved for each heat output by varying the fuel pressure.

The vehicle burner 6 being shown here has, moreover, at least one pressure sensor 23, which is coupled with control 17 via a signal line 24. The fuel pressure in the fuel line 12 can be measured by means of the pressure sensor 23, namely, between the fuel pump 10 and the injection nozzle 11. The pressure sensor 23 may be arranged for this directly at the fuel line 12 or on the outlet side at the fuel pump 10 or on the inlet side at the injection nozzle 11. To set the fuel pressure determined, which forms a fuel pressure set point, control 17 can now compare the fuel pressure measured by means of pressure sensor 23, which forms an actual fuel pressure, with the fuel pressure set point in order to regulate the fuel pump 10 as a function of the difference. In other words, control 17 regulates the fuel pump 10 as a function of a variance comparison of the fuel pressure. A proportional control may be advantageous for the pressure regulation. A Proportional-Integral-Derivative (PID) controller algorithm or even another control algorithm may be used as well. The goal of the control is to achieve the smallest possible variations in pressure in fuel line 12.

In addition or as an alternative, the vehicle burner 6 may be equipped with at least one temperature sensor 25, which is coupled with control 17 via a signal line 26. Temperature sensor 25 is provided for measuring a combustion chamber temperature. For example, temperature sensor 25 measures the temperature of a wall of the combustion chamber 7. Temperature sensor 25 may also measure the temperature of the burner waste gases. Control 17 can now take into account the current combustion chamber temperature when determining the necessary fuel pressure. This taking into account may already be incorporated in the characteristic diagram 22. By taking the combustion chamber temperature into account, it is possible, for example, to vary the droplet size in order to optimize the evaporation of the injected fuel. In addition or as an alternative, the ambient temperature and/or the fuel temperature may be taken into account in order to compensate, e.g., differences in viscosity by selecting a correspondingly adapted fuel pressure. The droplet size is correlated with the fuel pressure, and this correlation between droplet size and fuel pressure is used when taking the combustion chamber temperature into account.

Control 17 can vary the delivery capacity of fuel pump 10 in order to set the particular desired fuel pressure. Fuel pump 10 may be designed, for example, as a rotary pump, e.g., in the form of a centrifugal pump or a gear pump or a vane-type rotary pump or the like. Control 17 can vary the speed of rotation in case of such a rotary pump in order to set the particular delivery capacity and hence the fuel pressure. As an alternative, fuel pump 10 may also be designed as a reciprocating pump, for example, a piston pump or a diaphragm pump or the like. The control can vary the stroke travel and/or stroke velocity in order to set the particular desired delivery capacity and hence the fuel pressure. As an alternative. the fuel pump 10 in question may have a throttle, which can be set by means of control 17, as well as a bypass. Fuel pump 10 now operates stationarily and the outlet-side pressure can be set by varying the throttling. Fuel not needed flows back into the tank via the bypass or it flows back internally to the section side.

According to the embodiment being shown here, a pressure reservoir 27 can be connected to the fuel line 12, as a result of which it is possible to compensate and attenuate variations in pressure in the fuel-carrying system. An embodiment in which the fuel line 12 is designed as a pressure reservoir 28 at least in a section leading from the fuel pump 10 to the injection nozzle 11 is especially advantageous here. For example, said line section 28 has a comparatively large volume.

Corresponding to an advantageous embodiment, control 17 may be designed such that it takes the elasticity of compression of the fuel system into account when setting the fuel pressure. Said fuel system extends from the fuel pump 10 to the injection nozzle 11 and thus comprises at least the corresponding section of the fuel line 12 and especially the pressure reservoir 27 or 28.

Figure 2:
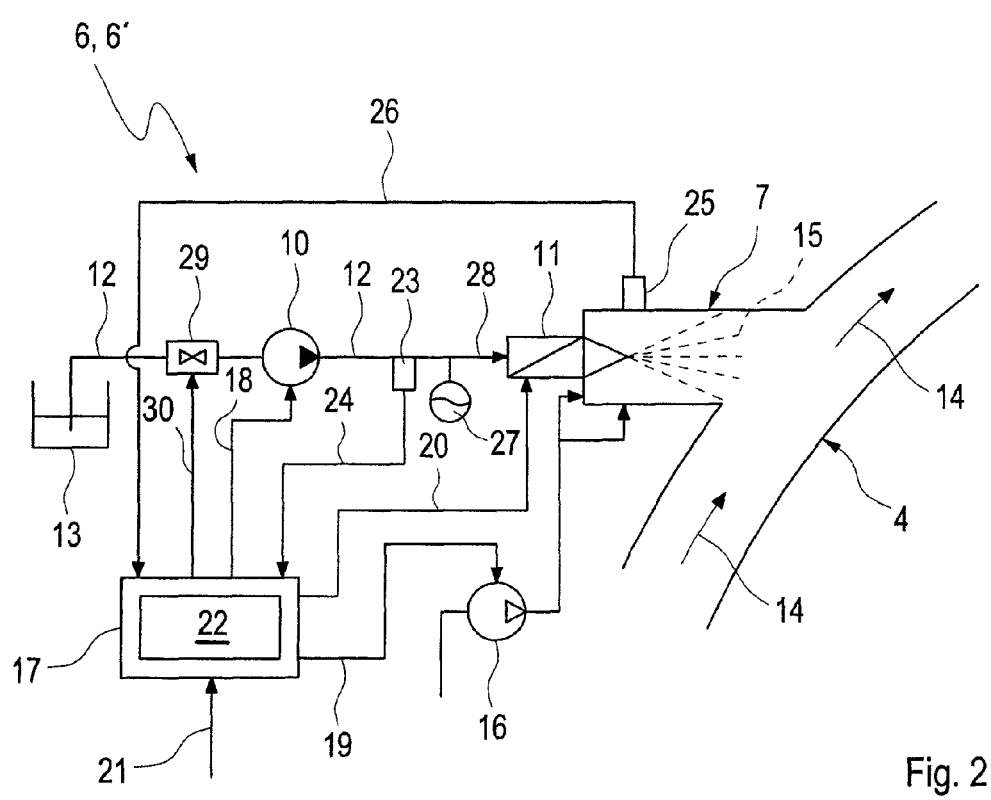
FIG. 2 is a greatly simplified, circuit diagram-like schematic view of the vehicle burner.

In the example according to FIG. 2, the vehicle burner 6 is equipped, moreover, with a blocking means 29, which may be, for example, a valve, especially a solenoid valve. The blocking means 29 is coupled with control 17 via a control line 30. It is arranged in the fuel line 12, namely, preferably upstream of the fuel line 10. It is arranged as close to the fuel tank 13 as possible. Control 17 actuates the blocking means 29 when the vehicle burner 6 is switched off to block fuel line 12. The fuel line 12 is consequently blocked when the vehicle burner 6 is switched off. In an alternative embodiment, the fuel pump 10 may have a blocking function independently from its construction, so that an additional blocking means 29 may be dispensed with. The blocking function of the particular fuel pump 10 may be embodied, for example, by a defined relative position of a delivery member of fuel pump 10. With the blocking function activated, fuel pump 10 blocks the fuel line 12. Control 17 can now actuate the fuel pump 10 to activate the blocking function when the vehicle burner 6 is being switched off. The fuel line 12 is consequently blocked with the vehicle burner 6 switched off.

The pressure ranges in which the fuel pressures can be varied depending on the heat output of the vehicle burner 6 depend especially on the fuel pump 10 and may be, for example, in a range of 1 bar, inclusive, to 10 bar, inclusive. A pressure range of 2 bar, inclusive, to 8 bar, inclusive, is preferable. A pressure range of 3 bar, inclusive, to 6 bar, inclusive, may be especially advantageous.

Figure 3:
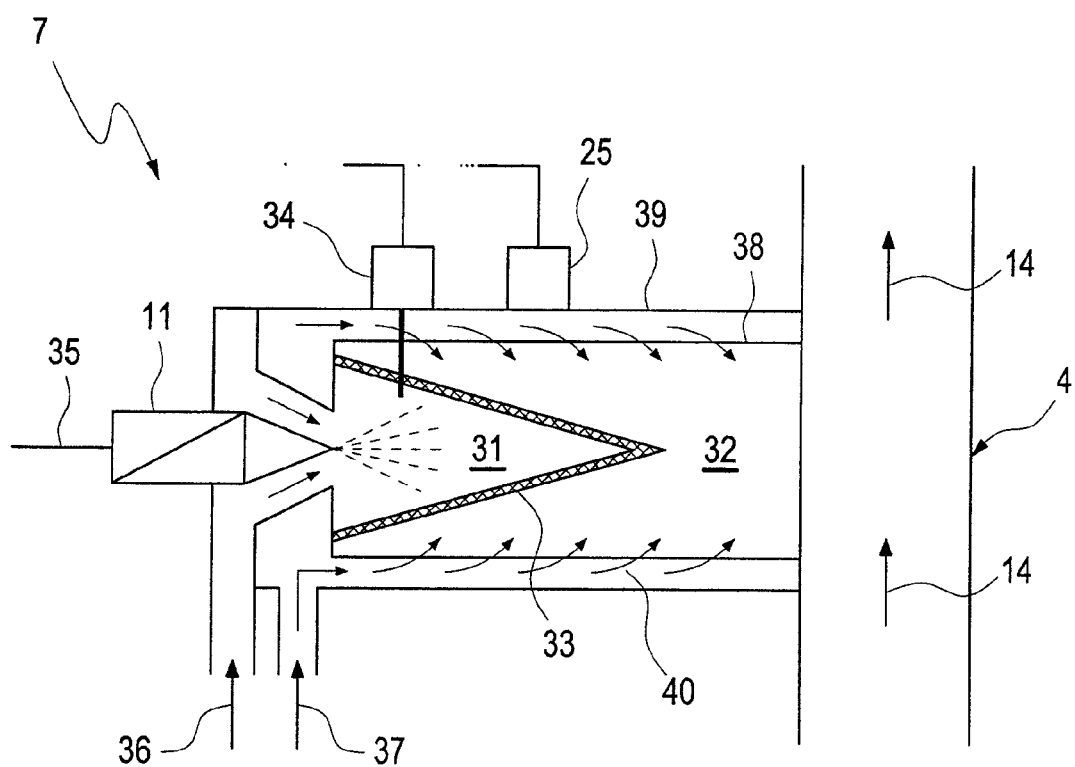
FIG. 3 is a greatly simplified, circuit diagram-like schematic view of a combustion chamber of the vehicle burner.

Corresponding to FIG. 3, the combustion chamber 7 may have a primary combustion zone 31 and a secondary combustion zone 32. The injection nozzle 11 is arranged at the combustion chamber 7 such that it injects the fuel exclusively into the primary combustion zone. Combustion chamber 7 has a porous structure 33, through which flow is possible and which separates the primary combustion zone 31 from the secondary combustion zone 32. Structure 33 ensures that no liquid fuel enters the secondary combustion zone. However, fuel in the vapor form is definitely intended to pass through structure 33 and into the secondary combustion zone 32. The conversion of the fuel in the combustion chamber 7 can thus be divided into a preoxidation, which takes place in the primary combustion zone 31, and a postoxidation, which takes place in the secondary combustion zone 32. Structure 33 is preferably conical here. A cylindrical shape is conceivable as well. To ignite the combustion reaction, an igniting means 34, for example, a sheathed element glow plug or a spark plug or a piezo igniter, may be provided An arrow 35 indicates the feed of the liquid fuel to injection nozzle 11. The air delivered by the air delivery means 16 is divided in the combustion chamber 7 shown in FIG. 3 into primary air 36 and secondary air 37, which is indicated by corresponding arrows. The primary air 36 is fed to the primary combustion zone 31, while the secondary air 37 is fed to the secondary combustion zone 32. The primary air 36 may flow especially coaxially with the injection jet into the primary combustion zone 31.

Combustion chamber 7 has an inner tube 38, in which the two combustion zones 31, 32 as well as structure 33 are arranged. Furthermore, the combustion chamber 7 has an outer tube 39, which is arranged coaxially with the inner tube 38, surrounds same and forms an annular space 40. The secondary air flows into the secondary combustion zone 32 through this annular space 40. The secondary air now flows through a wall of the inner tube 38, which has corresponding wall openings for this purpose. Combustion chamber 7, especially the secondary combustion zone 32, is again connected on the waste gas side or outlet side corresponding to FIG. 3 to the exhaust system 4, in which a waste gas flow 14 prevails. Even though a vertical arrangement of the combustion chamber 7 and exhaust system 4 is shown in FIG. 3, other angles may also be provided to reduce the flow resistance.

While specific embodiments of the invention have been described in detail to illustrate the application of the principles of the invention, it will be understood that the invention may be embodied otherwise without departing from such principles.

What is claimed is:

1. A vehicle burner for heating a gas flow in a motor vehicle, the vehicle burner comprising:
    a combustion chamber;
    an injection nozzle;
    a fuel pump for delivering a fuel to the injection nozzle, the fuel pump being actuated for injecting fuel into the combustion chamber;
    an air delivery and/or air regulating means for delivering air to the combustion chamber;
    a control for operating the vehicle burner, the control being coupled with the fuel pump, with the air delivery and/or air regulating means and with the injection nozzle, wherein the burner waste gas, which is generated during the operation of the vehicle burner by the reaction of fuel with air in the combustion chamber, is used to heat the gas flow, the control determining a quantity of fuel, a quantity of air as well as a fuel pressure as a function of a heat output, which can be preset, and the control actuating the air delivery and/or air regulating means for setting the quantity of air determined, said control actuating the fuel pump such that said fuel pump is set at the fuel pressure determined, and said control actuating the injection nozzle for setting the quantity of fuel determined to set the predetermined heat output.

2. A vehicle burner in accordance with claim 1, wherein said injection nozzle is opened to a greater or lesser extent or a duration of opening said injection nozzle and a frequency of opening said injection nozzle are cycled as a function of said fuel pressure.

3. A vehicle burner in accordance with claim 2, further comprising:
    a fuel line; and
    a pressure sensor wherein:
    said fuel pump is connected to an injection nozzle via said fuel line;
    said pressure sensor is coupled with said control and is provided for measuring fuel pressure in said fuel line;
    said control regulates said fuel pump as a function of a variance comparison between a fuel pressure set point determined and a measured actual fuel pressure;
    said control determines a quantity of fuel as a function of a heat output that can be preset;
    said control determines a quantity of air as a function of the quantity of fuel determined and an air ratio that can be or is preset; and
    said control determines a fuel pressure as a function of the quantity of air determined and/or the quantity of fuel determined.

4. A vehicle burner in accordance claim 2, further comprising at least one of:
    a temperature sensor coupled with said control for measuring a combustion chamber temperature, wherein said control takes into account the current combustion chamber temperature when determining the fuel pressure;
    a temperature sensor coupled with said control for measuring the ambient temperature, wherein said control takes into account the current ambient temperature when determining the fuel pressure, and
    a temperature sensor coupled with said control for measuring a fuel temperature, wherein said control takes into account the current fuel temperature when determining the fuel pressure.

5. A vehicle burner in accordance with claim 2, wherein said control varies a delivery capacity of the fuel pump to set fuel pressure.

6. A vehicle burner in accordance with claim 5, wherein:
    said control varies a speed of rotation to set a delivery capacity in case of a fuel pump designed as a rotary pump, or
    said control varies the stroke travel and/or stroke velocity to set the delivery capacity in case of a fuel pump designed as a reciprocating pump.

7. A vehicle burner in accordance with claim 2, further comprising:
    a pressure reservoir connected to a fuel line connecting the fuel pump to the injection nozzle; or
    a pressure reservoir comprising a fuel line connecting the fuel pump to the injection nozzle.

8. A vehicle burner in accordance with claim 2, wherein said control takes into account the elasticity of compression of the fuel system extending from the fuel pump to the injection nozzle when setting the fuel pressure.

9. A vehicle burner in accordance with claim 2, further comprising:
    a fuel line leading from a fuel tank via said fuel pump to said injection nozzle;

a blocking means coupled with said control and arranged in said fuel line; and wherein said control actuates said blocking means to block said fuel line when the vehicle burner is switched off, so that the fuel line is blocked with the vehicle burner switched off.

10. A vehicle burner in accordance with claim 3, further comprising:
fuel line leading from a fuel tank via the fuel pump to the injection nozzle wherein a blocking function is integrated in said fuel pump and said fuel pump blocks said fuel line, and said control activates the blocking function when the vehicle burner is switched off, so that said fuel line is blocked with the vehicle burner switched off, said pressure sensor being located between said fuel pump and said injection nozzle.

11. A vehicle burner in accordance with claim 2, wherein said fuel pump and said control are designed such that fuel pressure can be set in a range of from 1 bar to 10 bar, or 2 bar to 8 bar or 3 bar to 6 bar.

12. A vehicle burner in accordance with claim 2, wherein:
said combustion chamber has a primary combustion zone and a secondary combustion zone;
said injection nozzle injects the fuel exclusively into said primary combustion zone;
said primary combustion zone is separated from said secondary combustion zone by a porous structure, through which flow is possible; and
said air delivered by the air delivery and/or air regulating means is divided into primary air fed into the primary combustion zone and secondary air fed into the secondary combustion zone.

13. A vehicle burner in accordance with claim 12, wherein said combustion zones and said porous structure are arranged in an interior space of an inner tube of said combustion chamber, said interior space being surrounded by an outer tube of said combustion chamber to define an annular space; and
said secondary air flows through said annular space and through wall openings of said inner tube to said secondary combustion zone.

14. A vehicle burner in accordance with claim 2, wherein said combustion chamber is connected on a waste gas side to an exhaust system of an internal combustion engine to heat at least one exhaust gas treating means.

15. A vehicle burner in accordance with claim 2, wherein said combustion chamber is arranged in a heating means for operated independently from an internal combustion engine of the vehicle as any one of a parking heater and auxiliary heater.

16. A motor vehicle system comprising: a vehicle burner comprising:
a combustion chamber;
an injection nozzle;
a fuel pump for delivering a fuel to the injection nozzle, the fuel pump being actuated for injecting fuel into the combustion chamber;
an air delivery device for delivering air to the combustion chamber;
a control coupled with the fuel pump, with the air delivery and/or air regulating means and with the injection nozzle, said control receiving a heat output as input, the control determining a quantity of fuel, a quantity of air as well as a fuel pressure as a function of said heat output, said heat output being preset for using burner waste gas generated during the operation of the vehicle burner by the reaction of fuel with air in the combustion chamber, to heat a vehicle gas flow, the control actuating the air delivery device for setting the quantity of air determined, actuating the fuel pump for setting the fuel pressure determined, and actuating the injection nozzle for setting the quantity of fuel determined to set the preset heat output.

17. A vehicle system in accordance with claim 16, wherein said injection nozzle is opened to a greater or lesser extent or a duration of opening said injection nozzle and a frequency of opening said injection nozzle are cycled as a function of said fuel pressure.

18. A vehicle system in accordance with claim 17, further comprising:
a fuel line;
a pressure sensor, said pressure sensor being located between said injection nozzle and said fuel pump; and
at least one of: a temperature sensor coupled with said control for measuring a combustion chamber temperature, wherein said control takes into account the current combustion chamber temperature when determining the fuel pressure, a temperature sensor coupled with said control for measuring the ambient temperature, wherein said control takes into account the current ambient temperature when determining the fuel pressure and a temperature sensor coupled with said control for measuring a fuel temperature, wherein said control takes into account the current fuel temperature when determining the fuel pressure wherein:
said fuel pump is connected to an injection nozzle via said fuel line;
said pressure sensor is coupled with said control and is provided for measuring fuel pressure in said fuel line;
said control regulates said fuel pump as a function of a variance comparison between a fuel pressure set point determined and a measured actual fuel pressure;
said control determines a quantity of fuel as a function of a heat output that can be preset;
said control determines a quantity of air as a function of the quantity of fuel determined and an air ratio that can be or is preset; and
said control determines a fuel pressure as a function of the quantity of air determined and/or the quantity of fuel determined.

19. A vehicle system in accordance with claim 17, wherein:
said combustion chamber has a primary combustion zone and a secondary combustion zone;
said injection nozzle injects the fuel exclusively into said primary combustion zone;
said primary combustion zone is separated from said secondary combustion zone by a porous structure, through which flow is possible;
said air delivered by the air delivery and/or air regulating means is divided into primary air fed into the primary combustion zone and secondary air fed into the secondary combustion zone;
said combustion zones and said porous structure are arranged in an interior space of an inner tube of said combustion chamber, said interior space being surrounded by an outer tube of said combustion chamber to define an annular space; and
said secondary air flows through said annular space and through wall openings of said inner tube to said secondary combustion zone.

20. A vehicle system in accordance with claim 17, further comprising:
an internal combustion engine;
an exhaust system connected to said an internal combustion engine; and an exhaust gas treating device connected to said exhaust system wherein said combustion chamber is connected on a waste gas side to said exhaust system to heat said exhaust gas treating device.

\* \* \* \* \*